(12) United States Patent
Gaspard

(10) Patent No.: US 10,328,810 B2
(45) Date of Patent: Jun. 25, 2019

(54) CHARGING DEVICE

(71) Applicant: WINSLIM, Luxembourg (LU)

(72) Inventor: Jean-Yves Gaspard, Gleize (FR)

(73) Assignee: WINSLIM, Luxembourg (LU)

( * ) Notice: Subject to any disclaimer, the term of this patent is extended or adjusted under 35 U.S.C. 154(b) by 284 days.

(21) Appl. No.: 15/128,788

(22) PCT Filed: Mar. 25, 2015

(86) PCT No.: PCT/EP2015/056335
§ 371 (c)(1),
(2) Date: Sep. 23, 2016

(87) PCT Pub. No.: WO2015/144739
PCT Pub. Date: Oct. 1, 2015

(65) Prior Publication Data
US 2017/0101015 A1    Apr. 13, 2017

(30) Foreign Application Priority Data
Mar. 25, 2014   (FR) .................................... 14 52487

(51) Int. Cl.
*H02J 7/00*    (2006.01)
*B60L 11/00*    (2006.01)
(Continued)

(52) U.S. Cl.
CPC ............. *B60L 11/182* (2013.01); *B60L 53/12* (2019.02); *B60L 53/14* (2019.02); *B60L 53/20* (2019.02);
(Continued)

(58) Field of Classification Search
CPC .......... H02J 7/0055; H02J 7/025; H02J 50/80; H02J 50/10; B60L 11/1811; B60L 11/182;
(Continued)

(56) References Cited

U.S. PATENT DOCUMENTS 4,980,812 A * 12/1990 Johnson, Jr. ............ H02J 9/062
363/126
5,633,577 A * 5/1997 Matsumae ............ H02J 7/0013
320/104

(Continued)

OTHER PUBLICATIONS

Hirokazu et al. (DE 102011083020 A1, published Mar. 21, 2013, Machine translated on Oct. 1, 2018 by European Patent Office Website https://www.epo.org, 32 pages).*

*Primary Examiner* — Phallaka Kik
(74) *Attorney, Agent, or Firm* — Wenderoth, Lind & Ponack, L.L.P.

(57) ABSTRACT

A charging device for electric vehicles includes two power sources interacting with a primary inductive device. The charging device also includes an input circuit having a first input connectable to a first power source, a second input and at least one output connectable to a charger, a secondary inductive device capable of being coupled to the primary inductive device for energy transfer between the primary inductive device and the secondary inductive device, thereby generating an induced electric signal at the output of the secondary inductive device, and a converter from the induced electric signal to an electric signal towards the second power supply input of the input circuit, the converter being configured such that the electric signal is similar to the electric signal of the first power source.

20 Claims, 2 Drawing Sheets

(51) Int. Cl.
*B60L 11/18* (2006.01)
*H02J 7/02* (2016.01)
*H02J 50/10* (2016.01)
*H02J 50/80* (2016.01)
*B60L 53/14* (2019.01)
*B60L 53/22* (2019.01)
*B60L 53/20* (2019.01)
*B60L 53/12* (2019.01)
*B60L 53/51* (2019.01)

(52) U.S. Cl.
CPC ............... *B60L 53/22* (2019.02); *B60L 53/51* (2019.02); *H02J 7/0055* (2013.01); *H02J 7/025* (2013.01); *H02J 50/10* (2016.02); *H02J 50/80* (2016.02); *B60L 2210/30* (2013.01); *B60L 2210/40* (2013.01); *Y02T 10/7005* (2013.01); *Y02T 10/7088* (2013.01); *Y02T 90/122* (2013.01); *Y02T 90/127* (2013.01); *Y02T 90/14* (2013.01)

(58) Field of Classification Search
CPC .............. B60L 11/1812; B60L 11/1816; B60L 2210/30; B60L 2210/40; B60L 2230/22; Y02T 10/7005; Y02T 10/7088; Y02T 90/122; Y02T 90/127; Y02T 90/14

USPC .......................................... 320/108, 104, 109
See application file for complete search history.

(56) References Cited

U.S. PATENT DOCUMENTS

| | | | | |
|---|---|---|---|---|
| 5,703,461 | A * | 12/1997 | Minoshima | B60L 11/182 320/108 |
| 7,733,670 | B2 * | 6/2010 | Feng | H02J 7/35 363/17 |
| 10,158,250 | B2 * | 12/2018 | Covic | H02J 50/12 |
| 2009/0212736 | A1 * | 8/2009 | Baarman | H02J 7/0004 320/106 |
| 2011/0128714 | A1 * | 6/2011 | Terao | H02J 7/025 361/807 |
| 2013/0020875 | A1 * | 1/2013 | Wozniak | H01M 10/46 307/72 |
| 2013/0088192 | A1 * | 4/2013 | Eaton | G06F 1/266 320/108 |
| 2014/0085944 | A1 * | 3/2014 | Lee | H02J 3/383 363/37 |
| 2014/0361739 | A1 * | 12/2014 | Kwak | H02J 5/005 320/108 |

* cited by examiner

CHARGING DEVICE

TECHNICAL FIELD OF THE INVENTION

The present invention relates to the field of battery recharging systems and electromagnetic induction devices. This invention may find an application in the field of electric vehicles.

STATE OF THE ART

Battery chargers for electric vehicles are devices that are connected to an electricity grid, henceforth known as the mains and allow charging of batteries.

In the case of electric and hybrid vehicles, these chargers can achieve very high powers, allowing a reduction in the charging time. The most powerful chargers are generally supplied with three-phase current are are not transportable. They directly access the battery to be charged via very heavy gauge cables.

So-called slow charging chargers are either removable or directly incorporated in the vehicle. In the latter case, all that is needed is to connect the vehicle to the mains, generally single-phase 230 V—16 A or 13 A for Europe. Modern all-electric vehicles, in spite of the output of the new batteries, have a limited range on the order of 150 km and require frequent recharging operations. The user, when leaving his/her vehicle, therefore periodically needs to take out an extension cable, connect the terminal and set the charger in operation. This operation rapidly becomes tiresome, since in order to cope with different terminal configurations, the extension cables are long and heavy, soon become dirty, particularly in bad weather, may be stolen owing to their high prices and occupy a great deal of space in the vehicle boot.

Inductive charging is an alternative method known and used in the industry in order to charge electric forklifts for example. The principle is simple: a high frequency generator, connected to the mains, supplies a primary coil. When a secondary coil is brought opposite the primary coil, a high frequency transformer is created and the primary coil supplies the secondary coil via a high frequency magnetic field. All that is needed is to recover the energy from the secondary coil to supply the battery charger for example and the link therefore dispenses with the extension cable, the disadvantages of which have been mentioned above.

The frequencies involved are generally greater than 16 kHz in order to avoid audible interferences and less than 150 kHz in order to simplify the power generator and limit the latter's losses. In view of the frequency bands allocated and the conducted and radiated electromagnetic compatibility rules, it is preferable to operate below 50 kHz. It is also preferable in view of the laws governing exposure of persons to electromagnetic fields to operate below 150 kHz.

Auxiliary electric battery charging systems for vehicles are known from the prior art, for example DE102011083020. These charging systems may for example have different sources of direct current electrical input. One or several rectifiers are used in this case in order to obtain a direct voltage signal appropriate to auxiliary battery recharging.

Use of inductive charging for electric and hybrid vehicles comprising at least two power sources has also been known since DE-10-2012-006-836. This document discloses use of at least two different power sources. One of the two sources is an alternating current source and the other source is a direct current source. According to this document, the direct current source is derived from a system of photovoltaic panels. It is thus possible to charge a vehicle supplied by an electric battery using solar power. In this document however, a system of photovoltaic panels comprising an inverter is mentioned and a second inverter capable of interacting with an inductor is mentioned.

These induction devices used in industry nevertheless call for a number of constraints:

Both inductors need to be placed opposite each other with a low offset in order to maintain coupling and therefore a correct output.

The distance between the two inductors depends on their size, their external diameter if they are round and beyond a gap equivalent to approx. ⅕th of the diameter, coupling becomes weak and power transfer problematic.

If the distance between the two inductors becomes wide, the coils need to be of substantial size, resulting in dimensions, cost and weight that become incompatible with an on-board solution for a vehicle.

If the distance between the two inductors becomes wide, the magnetic field diffuses inside and outside the air gap and any electrically conductive component placed in this field will be subject to induced currents that will cause its heating, which will be the case for example with the chassis.

It becomes difficult to comply with the standards concerning magnetic field emissions, both with regard to electromagnetic compatibility (CISPR11-EN55011) and exposure of persons (1999/519/CE).

Finally, within the context of inductive charging of electric vehicles, a major constraint emerges involving the availability and number of terminals. Indeed, electric vehicles, the charging of which is performed by induction, call for a specific charging installation. Consequently, unless a vacant induction terminal is found, the user cannot charge his/her car. Hence, the advantages offered by contactless electric vehicle charging are overshadowed by these limitations with regard to the means for their charging.

The present invention therefore proposes a hybrid system, specifically in the form of a kit, i.e. a wireless inductive energy transfer system wherein the energy is recovered in an induction winding and wherein said energy is restructured by on-board electronics reconstituting an electric current, having the same physical characteristics as the mains (for example 230 V-50 Hz), in the vehicle. This 230 V-50 Hz subsequently supplies the vehicle battery charger which has the impression of being conventionally connected to a mains socket whereas the energy is supplied wirelessly. Furthermore, in the event that no primary induction system is available, the battery charger connects to a mains socket in the convention manner.

SUMMARY OF THE INVENTION

According to one embodiment, the present invention relates to a charging device for electric vehicles based on at least two power sources, capable of interacting with a primary inductive energy transfer device, characterised in that:

It comprises an input circuit having a first input connectable to a first power source, at least one second input and at least one output connectable to a charging module;

It comprises a secondary inductive device capable of being connected to the primary inductive device for energy transfer between the primary inductive device and the secondary inductive device, thereby generating an induced electric signal at the output of the secondary inductive device;

It comprises a converter from the induced electric signal to an electric signal towards the second power supply input of the input circuit, wherein the converter is configured such that the electric signal has the same physical characteristics as the electric signal of the first power source of the input circuit.

Hence, the present invention allows charging of an electric vehicle by means of two different power sources. The high versatility of this invention lies in the possibility of charging an electric vehicle independently using wireline charging or inductive charging. Finally, the high adaptability of this invention, for example in the form of a "kit", allows easier installation on existing electric vehicles, whether they employ wireline charging or inductive charging.

According to one embodiment, the present invention also relates to a system comprising a charging module and a charging device for an electric vehicle of the invention, even for retrofitting if the user decides to equip his/her existing electric vehicle with an inductive charging system.

According to one embodiment, the present invention also relates to an electric vehicle comprising a system according to the invention.

According to one embodiment, the present invention also relates to a charging installation comprising at least one power source, at least one charging terminal, having a control module and a primary inductive device, in addition to an electric vehicle of the invention.

BRIEF DESCRIPTION OF THE FIGURES

The purposes, objects as well as the characteristics and advantages of the invention will better emerge from the detailed description of an embodiment thereof which is illustrated by the following appended drawings wherein.

Figure 1:
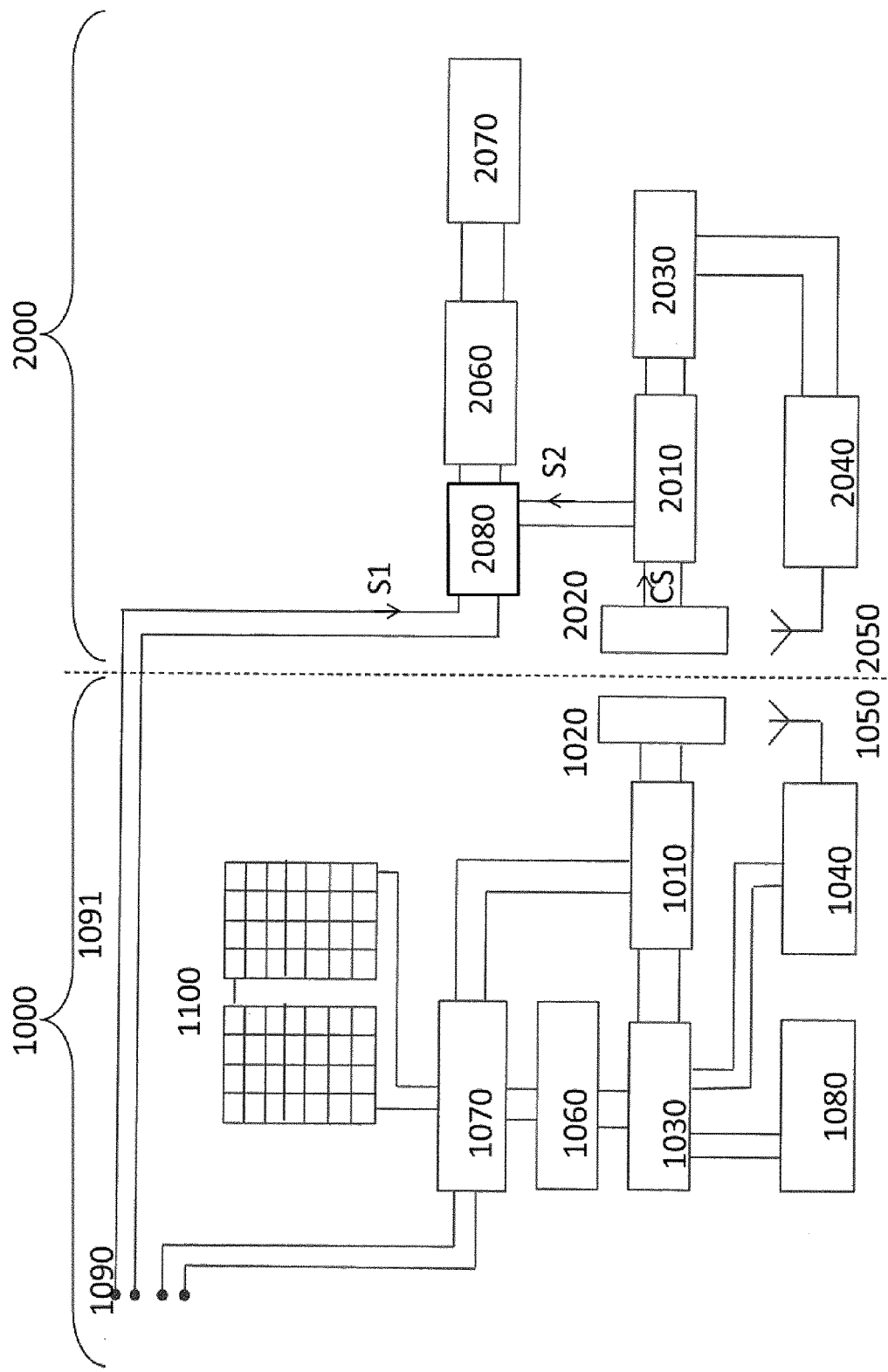
FIG. 1 shows the block diagram of the present invention.

The drawings appended herein are given as examples and are not limiting to the invention. These are schematic drawings intended to facilitate the understanding of the invention and are not necessarily at the same scale of the practical applications.

DETAILED DESCRIPTION OF THE INVENTION

Before going into the details of the preferred embodiments, more particularly with reference to the figures, different options that the invention may display preferentially but not restrictively, wherein these options may be implemented either alone or in any combination, are enumerated hereunder:

Advantageously, the device comprises a control module 2030 having means of control of the input circuit 2080 and means of control of a wireless data module (2040, 2050), wherein said wireless data module (2040, 2050) is configured to receive and emit synchronisation data between the electric signal S1 derived from the first power source 1090 and the electric signal S2 at the output of the converter 2010.

Advantageously, the input circuit 2080 comprises a switch between the first power supply input S1 and the second power supply input S2. The switch is capable of performing a switching operation, by all technical means, between the inputs.

Advantageously, the converter 2010 of electric signals comprises an inverter.

Advantageously, the output electric signal S2 of the converter 2010 and preferentially at the inverter output, has the same physical characteristics as the input electric signal S1 derived from the first power source of the input circuit 2080.

Advantageously, the first input of the input circuit 2080 is configured for an alternating electric signal S1 derived from a mains power source.

Advantageously, the first power supply input of the input circuit 2080 comprises a wireline connecting element.

Advantageously, a control module 2030 has means of control of the input circuit 2080.

Advantageously, the converter of electric signals 2010 is governed by the control module 2030.

Advantageously, the wireless data module (2040, 2050) is governed by the control module 2030.

Advantageously, the wireless data module (2040, 2050) is configured to receive and emit synchronisation data between the electric signal S1 derived from the first power source of the input circuit 2080 and the output electric signal S2 of the converter 2010.

Advantageously, the power supply input of the charging module 2060 is configured to receive an electric signal possessing the same physical characteristics as the electric signal derived from the mains power source 1090.

Advantageously, the output of the electric signal for recharging the charging module 2060 is connect to the at least one battery 2070.

Advantageously, the first power source is connectable to the first input of the input circuit 2080 and is connected to the primary inductive device 1020.

Advantageously, at least one power source is a mains power source 1090.

Advantageously, a wireline link is possible between the first power source and the first input of the input circuit 2080.

Advantageously, at least one of the two power sources is a power source supplying a direct electric signal 1100.

Advantageously, at least one of the two power sources is a power source supplying a direct electric signal comprising photovoltaic panels 1100.

Advantageously, the source of a direct electric signal derived from the photovoltaic panels 1100 is capable of interacting with only one single inverter 1010 located at a power terminal 1000 and configured to supply a primary inductive device 1020.

Advantageously, a switch 1070 is capable of interacting with at least both power sources (1090, 1100) so as to be able to switch from one power source to another in order to supply the primary inductive device 1020.

Advantageously, the wireless data module (1040, 1050) emits and/or receives electric signal synchronisation data towards and/or from the wireless data module (2040, 2050).

Advantageously, the energy transfer between the primary inductive system 1020 and the secondary inductive system 2020 is performed wirelessly.

Advantageously, the energy transfer between the primary inductive system 1020 and the secondary inductive system 2020 is by magnetic coupling.

Advantageously, the wireless data module (2040, 2050) is used to receive and/or emit electric signal synchronisation data.

Advantageously, the wireless data module (1040, 1050) is used to receive and/or emit data.

Advantageously, the wireless data module (1040, 1050) is used to receive and/or emit electric signal synchronisation data.

Advantageously, the charging module 2060 has at least one power supply input and at least one recharging electric signal output.

Advantageously, charging of the battery 2070 is performed trough at least one mode among a wireline mode and a wireless mode.

Advantageously, the wireless charging mode is an inductive charging mode.

Advantageously, the charging terminal 1000 comprises a converter 1010 of electric signals.

Advantageously, the charging terminal 1000 comprises a converter 1010 of electric signals.

Advantageously, the charging terminal 1000 comprises at least two different electric power sources (1090, 1100).

Advantageously, at least one of the two power sources supplying the terminal 1000 is a power source supplying alternating electric signals 1090.

Advantageously, at least one of the two power sources supplying the terminal 1000 is a mains power source 1090.

Advantageously, at least one of the two power sources supplying the terminal 1000 is a power source supplying direct electric signals 1100.

Advantageously, at least one of the two power sources supplying the terminal 1000 is a power source obtained from green energy 1100.

Advantageously, at least one of the two power sources supplying the terminal 1000 is a power source supplying direct electric signals originating from photovoltaic panels 1100.

Advantageously, a switch 1070 is capable of interacting with at least both power sources (1090, 1100) so as to be able to switch from one power source to another.

Advantageously, the control module 1030 has means of control of the switch 1070.

Advantageously, the control module 1030 has means of control of the converter 1010.

Advantageously, the control module 1030 has means of control of a user interface 1080.

Advantageously, the control module 1030 comprises a maximum power point tracking (MPPT) module for controlling the inverter 1010 when the terminal 1000 is switched to the operating mode adapted to a power source supplying direct electric signals 1100.

Advantageously, the maximum power point tracking (MPPT) module 600 uses an algorithm of the Disturbance and Observation type.

Advantageously, the control module 1030 has means of control of a wireless data module (1040, 1050).

Advantageously, a wireless data transfer module is established between the electric vehicle 2000 and the charging terminal 1000.

It should be noted that, within the scope of the present invention, the definition of the term "green energy", "intermittent energy" and "renewable energy" or their equivalents is energy obtained from a system of solar panels, wind energy and/or any other type of energy other than the mains and in particular, not displaying the same regularity over time. Furthermore, these intermittent energies are difficult to use, since they must be used immediately or stored for subsequent use. Storing these energies is not easy however, as one must avoid losses during storage, therefore avoid transporting them too far or converting them too often. The battery of an electric vehicle is a particularly useful storage element, as on the one hand, very many electric vehicles may exist and it is therefore possible to easily charge vehicles located close to the production elements and on the other hand, the stored energy is stored for its final use, unlike for example fixed storage batteries which would subsequently be required to restore the energy for entire different systems or even for its return to the electricity grid.

Inductor means an element for inductive energy transfer. Typically, this element may comprise a winding capable of generating a magnetic field, a magnetic circuit designed to increase the coupling with the secondary winding and shielding elements allowing protection of sensitive elements such as electronic components against magnetic fields. The inductor is designed to interact with a load such as a secondary winding.

It should also be noted that within the context of the present invention, the definition of the terms "charge", "recharge" or their equivalents is the action of transferring the energy to the battery with a view to its storage.

It should be noted that within the context of the present invention, the term electric vehicle includes any elements providing electric mobility, such personal assistance equipment, electric wheelchairs, electric trolleys, electrically-assisted movement, leisure items, electric go-carts and lightweight or heavyweight quadricycles, this not being an exhaustive list, any items equipped with a motor and a battery-type storage element capable of being considered covered by the term "electric vehicle".

It should be noted that within the context of the present invention, the definition of the terms "Radiofrequency", "RF", or their equivalent is emission/reception of electromagnetic waves, the frequency of which is less than 300 GHz. This type of communication mode is not limiting however and the invention can also be applied, non-restrictively, to infrared exchanges.

It should be noted that, within the scope of the present invention, the definition of the term "mains" or its equivalents is a source of AC current emitting a signal with regular electrical parameters, derived from a network, for example a 230 V signal at a frequency of 50 Hz, obtained from a national grid.

Preferably, the term "mains" or its equivalents includes a source of AC current supplied by a non-transportable installation generating electricity, for example a nuclear power plant.

Advantageously, the term "mains" or its equivalents includes a source of AC current supplied via a public mains grid intended for domestic use for example.

It should be noted that within the context of the present invention, the definition of the term "mains zero" or its equivalents is the point of the sine wave of the electric signal passing through a value equal to zero volts.

According to one embodiment, the present invention provides a user of an electric vehicle the possibility of charging his/her vehicle battery by a wireline or wireless method. In the case of the wireline method, the user has a power supply cable that s/he connects between an electrical input such as a plug on his/he vehicle intended for this purpose and an electrical input of a terminal such as a socket likewise intended for this purpose. In this connection mode, the energy used to charge the vehicle is derived from a source supplying alternating electric signals, the mains.

If wireless, i.e. contactless charging of the vehicle is selected, said vehicle needs to have a secondary inductive system allowing contactless charging of its battery by simple magnetic coupling with a terminal possessing a primary inductive system. Thus, the user may select the available supply mode that s/he wishes to use by means of an interface provided for this purpose. For example, s/he may decide to use solar energy as the power source for charging his/her vehicle or alternatively use the mains power source while remaining in contactless charging mode.

According to one embodiment, the primary inductive system awaits a vehicle. The primary system periodically activates detection of a load on the inductor.

According to one embodiment, the present invention comprises wireless means of communication used to detect the vehicle. Advantageously, the wireless communication is established by an RF link. When the RF link (or any other wireless means of communication) has detected a vehicle equipped with a secondary inductive device, the primary inverter is activated in order to detect the presence of the secondary winding by inductive coupling. This is a means of securing the inductive load protocol: if the inductive system initiates detection and a metallic load is introduced opposite the inductive system, the latter could be set in operation. Finally, this wireless link may offer the advantage for example of being able to incorporate any useful data in the communication protocol, i.e. identification of the vehicle, payment method if required, battery charging, recharging urgency (reading of the data concerning the km remaining to be driven on the GPS data . . . ).

Finally, one should also be aware that knowledge exists of how to analyse the inductive coupling and that parameters such as peak current and phase are capable of providing us indications concerning the relative offset of the induction coils, which is information that can be displayed in real time to assist in centring of the induction coils.

If no load is detected, the primary inductive system returns to standby.

If a load is detected, a converter is activated in order to supply the necessary energy to the secondary inductive system for its supply and therefore its activation.

Once the wireless connection has been established between the primary inductive module and the secondary inductive module, the primary inductive module sends data via wireless means of communication that include synchronisation frames allowing the control module governing the secondary inductive system to switch to the zero of the mains power source. When the secondary inductive system is powered up, it waits for reception of the synchronisation frames. When it receives a synchronisation frame, it replies by sending the value of the output voltage of the secondary inductive system. The control module governing the primary inductive system obeys existing communication protocols and once these protocols have been completed, the control module governing the primary inductive system considers the link as established. The RF link is maintained in this case in order to allow both inductive systems to exchange the synchronisation data and the information of the output voltage of the secondary inductive system.

Unlike the prior art in which a wireless link can be used to adjust mechanically the relative position of the secondary winding in relation to the primary winding in order to optimise the inductive coupling, the present invention advantageously makes avail of this wireless link in order to synchronise the electric signals between the primary winding and the secondary winding in order to optimise the energy transfer.

At the output of the secondary inductive device, the electric current advantageously possesses the same physical characteristics as the mains power source in order to arrive at the input circuit. In order to achieve this, it is desirable to synchronise the electric signal at the output of the secondary inductor with the mains. To this end, the device uses the RF link.

Once the RF link is established, the secondary inductive system activates an output relay in order to supply the vehicle. A charging setpoint is established at 230 V by way of a non-restrictive example; at the same time, the primary inductive system will maintain this setpoint independently of the charge in the inductive circuit, i.e. this setpoint is maintained regardless of the current called for by the charging module.

This status is preferentially maintained until the battery is completely charged and is only interrupted if:

A safety function is activated at the level of the primary and/or secondary inductive system (temperature problem, electric current problem, short circuit, by way of non-restrictive examples).

The RF link is disturbed beyond a preconfigured threshold and/or is cut off.

The magnetic coupling decreases, i.e. the secondary inductive system distances itself for example from the primary inductive system. This may correspond for instance to a movement of the vehicle.

In all these cases, the primary inductive system is stopped and resumes in detection mode.

FIG. 1 shows a block diagram of the present invention according to one non-restrictive embodiment. This figure is composed of two separate blocks: blocks 1000 and 2000. The block 1000 corresponds to an inductive charging terminal and block 2000 corresponds to the device to be charged. In the case, non-restrictive for example, of charging of an electric vehicle, the block 2000 corresponds to said vehicle and its electric charging device. The inductive terminal 1000 consists, among other aspects, of a converter of electric signals 1010 comprising or advantageously consisting of an inverter and possessing at least two different power source inputs and an output towards a primary inductive device 1020. This primary inductive device 1020 comprises a primary winding advantageously equipped with a magnetic circuit and shielding elements. Furthermore, this primary inductive device 1020 is capable of interacting with a secondary inductive device 2020 for energy transfer.

This energy transfer is performed by a magnetic coupling. The two power sources are illustrated here as being a source supplying alternating electric signals, the mains 1090 and a source supplying direct electric signals, photovoltaic panels 1100. These two sources of electric signals are connected to a switch 1070 used to toggle from one power source to another depending on the energy requirements, the energy availabilities of each source and/or the user parameters configured by said user via a user interface 1080. A control module 1030 controls the converter 1010. A measuring module 1060 measuring the available power is connected between the switch 1070 and the controller 1030. If the switch 1070 is in photovoltaic mode, the control module 1030 governs the converter 1010 so as to perform maximum power point tracking (MPPT). This measuring module can also inform of the presence of power on the photovoltaic panels regardless of the position of the switch 1070 and hence it is possible to trip the switch 1070 only if sufficient photovoltaic power is present on the photovoltaic panels. The MPPT system operates, for example non-restrictively, according to an algorithm of the Disturbance and Observation (D&O) type. The algorithm can be implemented in a computer program stored itself in a memory and readable in the form of instructions by at least one processor; advantageously, the algorithm is programmed in the memory of the control module 1030 governing the inverter 1010. This algorithm involves seeking a maximum power point by trials/errors. Indeed, the system attempts to reach the maximum power point starting from a high frequency of the converter 1010 and by gradually reducing the latter, measuring the voltage and current via the measuring module 1060 in order to calculate the power and adjust the frequency of the converter 1010 in order to maximise this frequency, moreover continuously.

Next, the inductive terminal 1000 also has a wireless data reception and transmission module 1040 connected to an RF antenna 1050. This module 1040 is connected to the controller 1030.

Finally, the block 2000 comprises, among other aspects, a converter 2010 and a secondary inductive device 2020 in the form of a secondary winding which can be combined itself with its own magnetic circuit and means of shielding. Advantageously, the symmetry between the primary and secondary inductors improves the energy transfer between the primary inductive system and the secondary inductive system. A control module 2030 provides a connection between the converter 2010 and a wireless transmission module 2010 connected to an RF antenna 2050.

The inductive terminal 1000 and the charging system 2000 both have means of communication by radiofrequency (1040, 1050), (2040, 2050). Indeed, according to one embodiment of the invention, it is desirable to synchronise the phases of the electric signals between the two inductive system (1020, 2020), as during the start-up phase or when the output load absorbs little current, the shape of the envelope of the voltage of the secondary inductive device 2020 is not a sine wave and does not pass through zero again. In order to synchronise the phases between both electric signals, the RF transmission systems (1040, 1050) and (2040, 2050) of each of the inductive systems are used to synchronise both electric signals on the zero voltage point of the mains power source. This subsequently allows conversion of the induced electric signal into an electric signal possessing the same characteristics as the electric signal derived from the mains power supply and moreover at the output of the converter 2010. Furthermore, in the case of connection to the mains power source, the voltage is generally stable, but may fluctuate widely depending on the user's power requirement and the impedances of the power lines. It is for example possible to have an idle voltage of 230 V and have a voltage of 200 V when a 3700 W load is supplied by this mains power source. In the case of the present invention, the output voltage is slaved regardless of the power required and therefore the charging module 2060 is always supplied at its nominal voltage and delivers its nominal power.

It will be noted that the invention takes advantage of a mains-type network source not only in order to offer an alternative possibility of supplying the charger, but also in order to provide a reference signal for correct operation of the converter 2010.

In particular, if the power source of the primary inductive device 1020 is a mains power source 1090, the control module 2030 works together with the wireless communication module 2040 in order to synchronise the output electric signal S2 of the converter 2010 so that this output electric signal S2 displays the same physical characteristics as the electric signal derived from a mains power source 1090.

Advantageously, if the power source of the primary inductive device 1020 is a source supplying direct electric signals 1100, the control module 2030 governs the converter 2010 using an internal clock as the synchronisation signal so that the electric signal S2 displays the same physical characteristics as the electric signal derived from a mains power source 1090.

Figure 2:
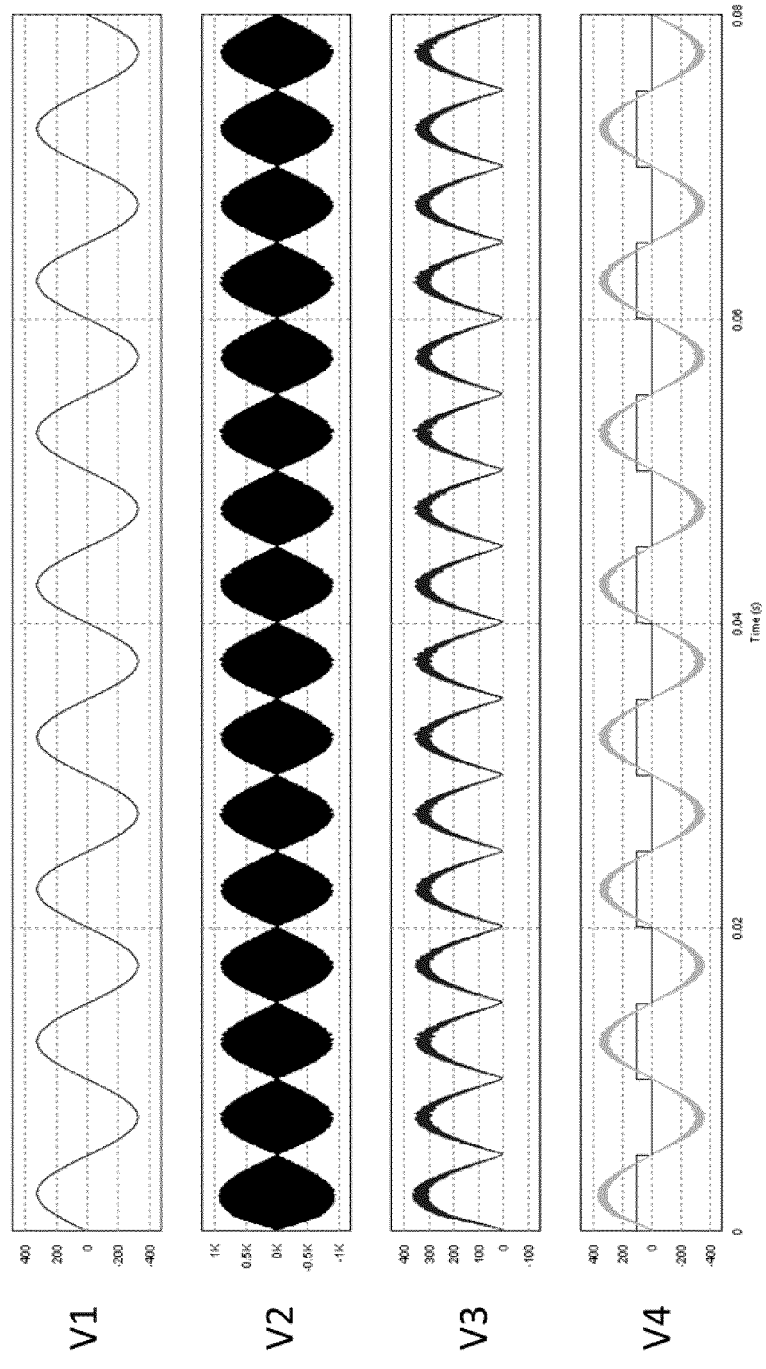
FIG. 2 shows the electric signals circulating in the present invention at different points of the power circuits.

FIG. 2 shows an illustration of the shape of the electric signals depending on their position in the power circuit of the present invention. The first curve, V1, corresponds to the electric signal of the mains power source. The second curve, V2, corresponds to the electric signal passing through the primary inductor and the secondary inductor during operation; it is the output current OC. The third curve, V3, corresponds to the rectified and filtered OC current. Finally, the fourth curve, V4, corresponds to the electric signal at the output of the inverter 2010; it is signal of the second power source, S2. In order to obtain the fourth curve based on the third, the inverter 2010 comprises a switch governed by the control module 2030. The control module 2030 receives the switch control parameters via the wireless synchronisation signal derived from the primary inductive device 1020.

Next, the output of the converter 2010 is connected to an input circuit 2080, itself connected to the charging module 2060, itself connected to batteries 2070 and serving to charge the latter. This input circuit 2080 has for example at least two power supply inputs, each designed to receive an electric signal, S1 and S2, possessing the same physical characteristics as the current derived from the mains power source S1. This input circuit 2080 subsequently has at least one output connected to a charging module, itself connected to at least one battery.

Furthermore, the function of the converter 2010 is to deliver electrical energy in the form of an alternating electric signal, for example 203 V and 50 Hz, similar to that of the mains power supply. Consequently, the charging module can also be used with a wireline power supply connected to the mains power supply via the connection 1091.

According to one embodiment, the input circuit 2080 provides the interface between two power sources (S1 and S2) and an output. This interface can be created simply by a physical connection of a power line for example. Advantageously, the interface between two power sources (S1 and S2) and an output comprises a switch.

The present invention, according to this embodiment, subsequently allows the user to simply connect his/her electric vehicle either to a mains socket for its charging or alternatively use the contactless charging mode with the inductive device equipping his/her vehicle.

According to one embodiment, the present invention features a method for charging electric vehicles. This charging method is a hybrid method, since it uses two separate charging methods: one by wireline and the other by induction. In order to be able to use the same electric charger as the present electric vehicles using wireline charging, the present invention uses an inductive device, the output electric signal of which has the same physical characteristics as the electric signal obtained from the mains power source. In order to match the electric signals of the inductive source and the mains power source, the present device uses communication by radiofrequency to synchronise the electric signals of both sources and a converter of electric signals to obtain the same physical characteristics as the electric signal derived from the mains power source.

The invention is not limited to the embodiments described above but applies to all the embodiments covered by the scope of the claims.

It should finally be noted that each vehicle has a specific battery and that the charger must cope with this specification. The fact that the inductive system supplies the charger and not the battery makes its use universal, i.e. the same inductive system can supply several chargers with widely differing output characteristics, since supplying batteries very different in terms of power and voltage.

REFERENCES

1000. Charging terminal
1010. Electric signal converter
1020. Primary inductive device
1030. Control module
1040. Wireless data
1050. Antenna
1060. Voltage measurement, current
1070. Switch
1080. User interface
1090. Mains power supply
1091. Wireline connection
1100. Photovoltaic panels
2000. Device to be charged
2010. Electric signal converter
2020. Secondary inductive device
2030. Control module
2040. Wireless data
2050. Antenna
2060. Charging module
2070. Battery
2080. Input circuit
V1. Electric signal of the mains power source
V2. Electric signal of the primary and secondary inductor
V3. Filtered and rectified electric signal of the secondary inductor
V4. Electric signal at the secondary inverter output
S1. Electric signal derived from the mains power source 1090
S2. Electric signal derived from the converter 2010
CS. Electric signal at the output of the secondary inductive device 2020

The invention claimed is:

1. A charging device for electric vehicles based on at least two power sources, the charging device being capable of interacting with a primary inductive energy transfer device, the charging device comprising:
   an input circuit having a first input connectable to a first power source, at least one second input and at least one output connectable to a charging module, wherein the first input of the input circuit is configured for an alternating electric signal derived from the first power source being a main power source;
   a secondary inductive device capable of being coupled to the primary inductive device for energy transfer between the primary inductive device and the secondary inductive device, thereby generating an induced electric signal at the output of the secondary inductive device;
   a converter from the induced electric signal to an electric signal towards the second input of the input circuit, wherein the converter is configured such that the electric signal has the same physical characteristics as the alternating electric signal of the first power source of the input circuit; and
   a control module configured to control the input circuit and to control a wireless data module,
   wherein the wireless data module is configured to receive and emit synchronization data between the alternating electric signal derived from the first power source and the electric signal at the output of the converter in order to optimize the energy transfer without mechanically adjusting the relative position of the secondary inductive device in relation to the primary inductive device, and
   wherein control module comprises a maximum power point tracking (MPPT) module for controlling the inverter when the terminal is switched to the operating mode adapted to a power source supplying direct electric signals.

2. The charging device according to claim 1, wherein the input circuit comprises a switch between the first input and the second input, capable of switching between the first input and the second input.

3. The charging device according to claim 1, wherein the converter comprises an inverter.

4. The charging device according to the claim 3, wherein the electric signal at an output of the inverter has the same physical characteristics as the alternating electric signal derived from the first power source of the input circuit.

5. The charging device according to claim 1, wherein the first input of the input circuit comprises a wireline connecting element.

6. A system comprising: the charging device according to claim 1; and a charging module.

7. The system according to the claim 6, wherein a power supply input of the charging module is configured to receive an electric signal possessing the same physical characteristics as the electric signal derived from a main power source.

8. The system according to claim 6, comprising at least one battery to which a charging output of the charging module is connected.

9. An electric vehicle comprising the system according to claim 6.

10. The electric vehicle according to the claim 9, wherein charging of the battery is performed through at least one mode among a wireline mode via the first input and a wireless mode via the second input.

11. A charging installation comprising: the electric vehicle according to claim 9; at least one power source; and at least one charging terminal having a control module and a primary inductive device.

12. The charging installation according to claim 11, wherein at least one power source is a main power source.

13. The charging installation according to claim 12, wherein the first power source is connectable to the first input of the input circuit and is connected to the primary inductive device.

14. The charging installation according to claim 12, comprising a wireline link between the first power source and the input circuit.

15. The charging installation according to claim 11, comprising a power source supplying direct electric signals.

16. The charging installation according to claim 15, wherein the power source supplying direct electrical signals comprises photovoltaic panels.

17. The charging installation according to claim 15, wherein the power source supplying direct electric signals interacts with one single converter configured to supply the primary inductive device.

18. The charging installation according to claim 11, wherein the input circuit is capable of interacting with at least two power sources so as to be able to switch from one power source to another in order to supply the primary inductive system.

19. The charging installation according to claim 11, wherein the first input of the input circuit comprises a wireline connecting element.

20. The charging device according to claim 1, wherein the maximum power point tracking (MPPT) module uses an algorithm of the Disturbance and Observation type.

* * * * *